INVENTORS
WILLIAM H. POWELL
LAWRENCE J. FRIEDMAN 3,359,352
PROCESS FOR PRODUCING DECORATIVE
SURFACE COVERING
William H. Powell, Livingston, and Lawrence J. Friedman,
Fort Lee, N.J., assignors to Congoleum-Nairn Inc.,
Kearny, N.J., a corporation of New York
Filed Sept. 16, 1966, Ser. No. 580,018
19 Claims. (Cl. 264—47)

ABSTRACT OF THE DISCLOSURE

This patent application relates to a method for forming a resinous composition surface covering having a geometric decoration by depositing a layer of fine granules of resinous composition on the surface of a base, sintering the granules by heating to form a porous layer, printing a design on the sintered layer with a printing composition which will penetrate into the porous composition and then heating the layer to form a non-porous layer containing the printed design. A textured or embossed product can be obtained by including with the granules a composition in fine particle form which can be removed or reduced in size on subsequent processing to create voids. Controlling the amount of printing composition to fill such voids can control the location and depth of the embossing.

---

This application is a continuation-in-part of application Ser. No. 464,979, filed June 18, 1965 now abandoned.

This invention relates to a process for forming surface coverings having a plastic decorative wear layer and particularly to surface coverings having an inlaid geometric decoration.

In accordance with present commercial practice, plastic surface coverings having a wear layer containing a thermoplastic synthetic resinous binder, plasticizers, pigments, etc. are widely used as coverings for floors, walls, countertops, and the like in the form of sheets and tiles. Vinyl resins, such as polyvinyl chloride and its polymers, particularly vinyl chloride copolymerized with vinyl acetate, are the most commonly used in formulating the synthetic resinous binders used in the production of such plastic surface coverings. When resins are blended with plasticizers, pigments and the like and sheeted, products are produced which have excellent wearing properties and resistance to attack by ordinary household chemicals. These products have an unusual clarity and brilliance of color, and the relatively low cost of vinyl resins makes them ideally suited for production of surface coverings having a large market.

The design and decoration of a surface covering is of prime importance in insuring acceptance of the product by the purchasing public. In recent years, there has been wide interest in products having a three-dimensional appearance, i.e., an appearance of depth. Such products can be produced by the processes disclosed in United States Patent 2,987,102, which issued June 6, 1961 to A. J. Heinrichs. In accordance with one of the procedures disclosed in this patent, blends of opaque and transparent or translucent chips are blended together and consolidated into a smooth sheet by the application of heat and pressure. A pigmented backing or a backing having a pigmented layer on its surface is secured to the undersurface of the pressed sheet either during or after the sheet formation. The pigmented layer is visible through the transparent or translucent areas of the top sheet and, therefore, gives the product the appearance of depth. Heretofore, such products could be produced having a geometric appearance, that is, a controlled decoration of repeating or definite design as contrasted to a random decoration, by utilizing stencils for applying different colored granules. The granules of each color are deposited through the stencil on a base so that different areas are covered by different colored granules. The deposited granules are thereafter molded together to form a unitary sheet. As is apparent, this procedure makes possible the formation of a large range of intricate reproducible patterns. The major disadvantage of such a procedure is the slow speed and careful control which must be exercised in handling the stencils to produce a product of the desired decoration and uniform thickness. As is apparent, irregularity in thickness can readily occur by having the stencils out of alignment so that a greater depth of granules are present in some areas as compared to other areas.

A low cost floor and wall covering is available which is produced by printing a design on a pigmented backing using a rotogravure press and then coating the entire surface with a thin transparent resinous coating. Such a product can be produced in a wide variety of designs but does not have any appearance of depth.

It is an object of the invention to provide a process for producing a resinous composition surface covering having a geometric decoration. Another object of the invention is to produce such a product having an appearance of depth. Another object is to produce such a product having a textured surface. A further object of the invention is to provide a simple and expedient process for producing such surface coverings. Other objects and the advantages of the invention will appear hereinafter.

In accordance with the invention, a surface covering having a geometric decoration is produced by depositing a layer of very fine granules of resinous composition on the surface of a base, heating the granules to form a partial coalescence or sintering of the granules and form a porous mass without applying any substantial pressure on the granules. The heating should be carefully controlled so that it is reasonably uniform throughout the thickness of the layer of granules. In this manner, the porosity of the layer is substantially uniform which is essential to produce the desired result. The sintered layer is then cooled and a design is printed on the surface with a composition which will penetrate into the sintered composition. The printed sintered layer is then subjected to heat and, if desired, pressure to form a non-porous layer. The resulting product is a resinous composition sheet which has the printed decoration extending into the sheet for any desired depth depending on the amount, type and/or viscosity of the printing composition applied. The product can be given a decorative three-dimensional apppearance by utilizing transparent or translucent granules. As as alternate procedure, the layer of granules can be printed before sintering, but such an operation requires very careful control to prevent displacement of the granules. Such printing on an unsintered layer could be accomplished by electrostatic means utilizing the process and apparatus disclosed in United States Patent 3,081,698, issued Mar. 19, 1963, which permits the printing composition to be applied as a powder without the printing apparatus touching the granules. It is essential to the invention that the granular layer have a uniform porosity and the printing compositions be similar in order to produce a repeating decoration which has the same degree of penetration and design fidelity.

A textured product can be obtained by allowing greater quantities of printing composition to remain on the surface. This can be accomplished by various means such as controlling the viscosity of the composition or the solids content of the printing composition. A textured or embossed surface can be produced in complete register with the printed design. This can be accomplished by inorporating in the granular layer a substance which on further treatment will create voids in the layer. The type of agents which create such voids are soluble compositions which can be washed out of the sintered composition, agents which will decompose upon heating, solid plasticizers which will be absorbed into the resin granules and compounds which will shrink or contract upon heating. Creating such voids has the additional advantage of materially aiding the penetration of the printing compositions. The granular layer containing the added agent is treated to create the voids. This can be accomplished simultaneously with sintering, or by a special treatment after sintering, such as washing with water or a solvent. The sintered product is then printed. The printing composition can partially or completely fill the voids. In the areas where no printing composition is applied, the voids will remain. The printed sheet is then heated which causes the resin particles to flow together and fill the voids. The surface of the resulting layer will have depressed areas which correspond in depth to the amount of voids present. This procedure provides a simple method for producing a product which has an inlaid printed decoration of any desired form and/or depth and which can be embossed in complete register with the printed design.

In some instances, penetration of the printing composition can be improved by placing a vacuum on the underside of the sheet. In such an arrangement, it is necessary for both the backing and the coating on the backing to be porous. Improved penetration of the printing composition can also be obtained by coating the granules with various types of agents to give the granules smoother surfaces. Typical of the agents which can be used for such coating are silicone waxes, stearic acid and the like.

The invention will be better understood from the following detailed description when read in conjunction with the accompanying drawings, wherein FIGURE 1 is a schematic representation illustrating one method of producing a decorative plastic surface covering in accordance with the invention;

FIGURE 6 is an enlarged cross-sectional view similar to FIGURE 4 except that the surface of the product is embossed.

Figure 1:
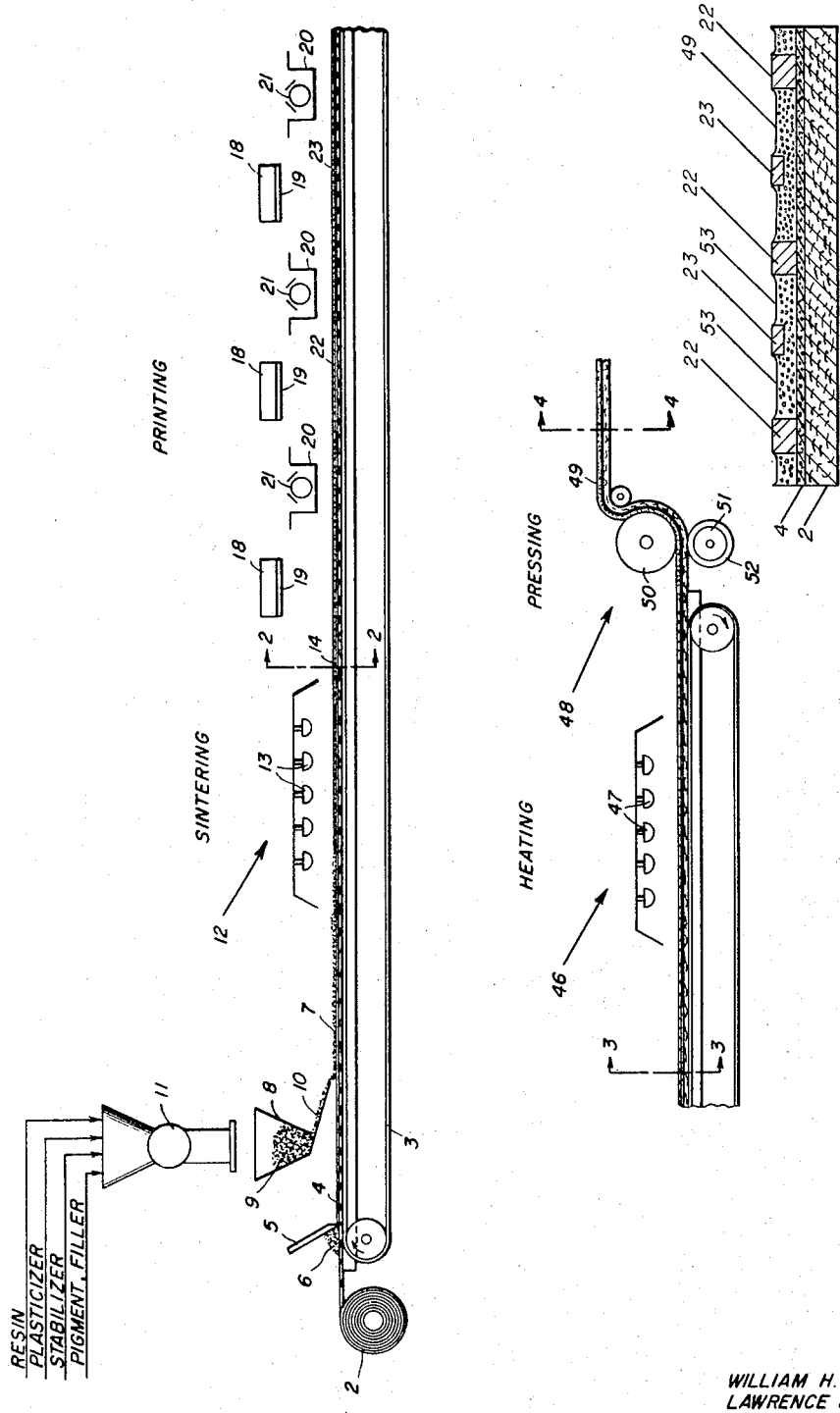
Figure 2:
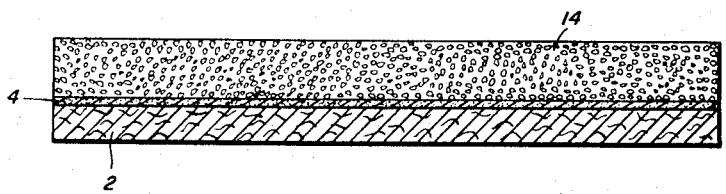
FIGURE 2 is an enlarged cross-sectional view taken along the line 2—2 showing the base after depositing the fine granules and sintering.
Figure 3:
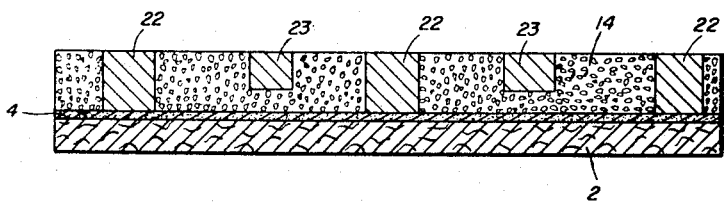
FIGURE 3 is an enlarged cross-sectional view taken along the line 3—3 after printing.
Figure 4:
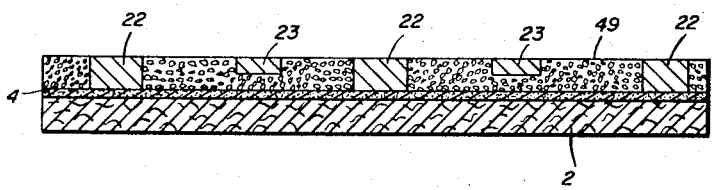
FIGURE 4 is an enlarged cross-sectional view taken along the line 4—4 showing the finished product having the base with the design and the granules molded together.
Figure 5:
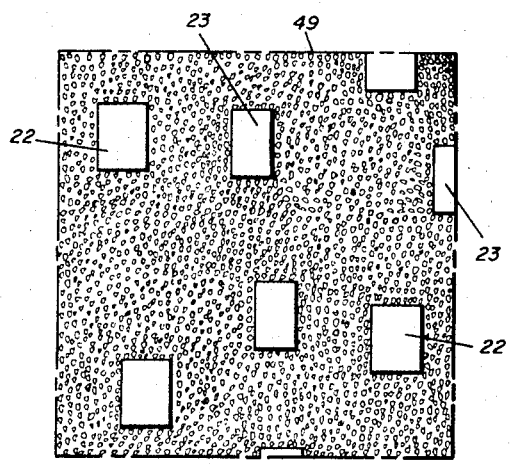
FIGURE 5 is a face view of a surface covering shown in FIGURE 4.

Referring to the drawings, a backing web such as a fibrous felt sheet 2 is fed to a continuous conveyer 3. A background pigmented adhesive coating 4 can be applied to the surface of the web by any suitable means, such as a doctor blade 5, from a reservoir of coating composition 6. The coated web is then conveyed to a distributing apparatus which covers the base with a smooth layer of fine granules 7. The distributing apparatus can be any of the conventional mechanisms such as a hopper 8, which holds the granule supply 9, and an inclined vibrating plate 10. The granules can be prepared by feeding the resin particles, plasticizer and stabilizer which components make up the composition to a mixer 11. If it is desired to produce an embossed product the agent to create the voids can be added in the mixer 11 or admixed in the feed hopper 8. The layer of granules 7 on the base is then passed to an oven, generally indicated at 12, which can be any type of heater, such as a bank of infra-red heat lamps 13. The granules are heated to a sufficiently high temperature to sinter the granules together. The granules are then allowed to cool and are passed to a printing apparatus, such as a silk screen apparatus or a conventional block printing machine, which deposits the resinous printing composition on the surface of the sintered granules 14. The decorative design can be multicolored by utilizing a series of printing blocks 18 with the appropriate design 19 etched on their surfaces and associated printing composition reservoirs 20 which supply fresh printing composition to the face of the printing blocks by means of a roll 21. The printing block 18 is compressed against the surface of the sintered granules 14, thereby depositing the printing compositions 22 and 23 on the surface of the sintered granules. When a particularly thick application of printing composition is desired, the design can be printed two or more times to build up the desired thickness of printing composition. The printing composition passes into sintered granules to a depth controllable by the amount of printing composition applied, its viscosity, particle size, porosity of granules, and similar factors. As can be seen by reference to FIG. 3, more printing composition is applied in area 22 than in 23 so, therefore, the printed design extends into the layer for a greater distance.

The printed sintered granules are then passed to a pressing unit generally indicated at 48 for consolidating the granules into a uniform non-porous sheet 49 by the application of heat and pressure. If desired, the granules can be heated prior to pressing by passing through a heating unit generally indicated at 46, such as a bank of infra-red heat lamps 47. The consolidation can take place between rolls such as a planishing unit. The planishing unit usually comprises a chrome surface roll 50 and a steel back-up roll 51 having a rubber cover 52. Alternately, the granules can be consolidated stepwise in a press or in a Rotocure. The product is usually reduced in thickness by about one-third to three-quarters of its original thickness. If desired, the pressing can be omitted entirely. If an agent is added to the granules which creates voids the resulting product will be embossed as illustrated in FIGURE 6 at 53 by having the consolidated granules depressed in the areas where the printing compositions were not applied. After pressing, the sheet is cooled and rolled on a suitable collection roll. The product can then be cut into the shape of tiles or any other desired shape. The product has a decoration conforming to the printed decoration which can be inlaid through the entire thickness of the product.

The backing sheet upon which the decorative sheet is formed is preferably a sheet of strong material. Strength is important in such backing material in order that the product withstand the strains occurring during manufacture and also when the product is installed. In the case of a flexible resilient product useful as a floor covering, it is desirable for the backing to have sufficient flexibility to permit the product to be rolled and unrolled without cracking or tearing. Suitable backing sheets include those formed of resinous compositions as well as sheets of impregnated felted fibers. Any of the thermoplastic or elastomeric resinous compositions which can be calendered or pressed to form a flexible sheet can be used to form backing sheets for use in the invention. Such resins as butadiene-styrene copolymer, polymerized chloroprene, polyvinyl chloride, polyvinyl acetate, vinyl chloride-vinyl acetate copolymer and the like can be compounded with plasticizers and fillers and sheeted to form a flexible backing sheet. In some cases, scrap and degraded resinous compositions can be salvaged by forming them into sheets which are useful as backing sheets in producing products in accordance with the invention.

Suitable backing sheets also include woven fabrics such as burlap and those formed from cotton, wool and various other synthetic, animal and mineral fibers. When utilizing such material, it is usually desirable to coat the surface with a pigmented resinous composition to hide the color of the backing, and form a good background for the printed design in the event the backing will be visible.

Such a composition can also serve as an adhesive to bind the fine granules to the backing. It has been found that felted cellulose or asbestos fibrous sheets impregnated with a waterproofing and strengthening impregnant are highly desirable backings for products prepared in accordance with the invention since they are low in cost and yet are flexible and strong. Numerous other fibrous materials can be used. The sheet can be formed from a slurry of fibrous material in water using any of the techniques conventionally employed in the manufacture of paper. For example, sheet formulation can take place on a Fourdrinier or cylinder paper machine. The fibrous sheet so prepared is then dried. Synthetic resinous materials are particularly suitable for use as impregnants for backing sheets. Suitable resins include vinyl resins, such as polyvinyl chloride, polyvinyl acetate, polymerized vinylidene chloride, mixtures of these with each other, copolymers with each other and will other monomers copolymerizable therewith, polymerized acrylic and methacrylic acids and their polymerized derivatives, polyethylene, polystyrene, butadiene-styrene copolymer, butadiene-acrylonitrile copolymer, natural rubber, polymerized chloroprene and the like. Thermosetting resins which under the influence of heat cure by polymerizing and cross-linking can also be used as impregnants. Such resins as phenolic resins, polyesters, oleoresins, i.e., drying oils and the like, isocyanates and polyurethanes and the like are suitable. A particularly desirable backing sheet is disclosed and claimed in U.S. Patent 2,992,963, which issued July 18, 1961, to Nagel et al.

The impregnating resins can be incorporated into the felted fibrous sheet by impregnation of the finished sheet with an emulsion or solution of the resin followed by drying of the sheet to remove the solvent. Alternately, the resin can be added as fine particles to the fiber furnish prior to sheet formation either as solid particles of resin or as an emulsion in water from which fine particles of resin are precipitated onto the fibers.

As indicated above, it is preferred to apply a pigmented layer to the surface of the backing sheet. This pigmented layer is particularly desirable when transparent or translucent granules are utilized and the surface of the backing sheet would be visible when viewed from the surface of the product. This layer can be of any color depending on the particular design effect desired in the finished product. It has been found particularly effective from the standpoint of cost and ease of application that the pigmented layer be formed on the backing by a coating technique. The coating composition comprises a resinous binder, pigment, filler and stabilizer in a liquid dispersion medium. An aqueous system has been found particularly effective and relatively inexpensive. In the coating composition, the ratio of resinous binder to pigment and filler is usually in the range of about 1:4 to 1.5:1. The resinous binder in the coating composition must also be compatible with the composition formed upon the decorative layer as described more fully hereinafter.

The preferred resinous binder in the coating composition comprises thermoplastic resinous material. The thermoplastic resinous binder can be made up solely of thermoplastic resinous material but it normally comprises a mixture of a thermoplastic resin, plasticizer, stabilizers, pigments and the like. Useful thermoplastic resins include polymers and copolymers of acrylic and methacrylic acids and their derivatives, the vinyl resins such as polymers of vinyl chloride, styrene, methylstyrene, butadiene and the like. Polymers of vinyl chloride have been found particularly effective in the formulation of coating emulsions in the invention. The vinyl chloride polymers can either be simple, unmixed homopolymers of vinyl chloride or polymers thereof in which the essential polymeric structure of polyvinyl chloride is interspersed at intervals with the residues of other ethylenically unsaturated compounds copolymerized therewith. Suitable monomers include, for instance, vinyl esters on the order of vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacyrlonitrile, diethyl maleate, diethyl fumarate and the like; vinylidene compounds on the order of vinylidene chloride, vinylidene bromide, vinylidene fluorochloride and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3, piperylene, divinyl ketone and the like.

Elastomeric resins such as butadiene-styrene copolymer, butadiene-acrylonitrile copolymer, polymerized chloroprene, natural rubber and the like can also be used as resinous binders in the formulation of coatings for use in the invention. Thermosetting resins can also be used as resinous binders in the coating composition, such as urea-formaldehyde resins, melamine resins, polyesters and the like. The use of coating compositions containing thermosetting resins is usually restricted to the situation where the decorative composition formed into a sheet upon the pigmented layer is also thermosetting, the resulting final product has to be cured to convert the resins to their set state. When a thermosetting resin is used, it should be in an uncured or partially cured state in the coating composition.

The coating composition usually contains a plasticizer. Useful plasticizers are esters of straight and branched chain alcohols with aliphatic acids, esters of aliphatic alcohols and aromatic acids, esters of aromatic alcohols and aliphatic acids, esters of aromatic alcohols and aromatic acids, organic esters of inorganic acids, high molecular weight hydrocarbon condensates and the like. Typical plasticizers of these types include dibutyl sebacate, dioctyl sebacate, dioctyl adipate, dioctyl azelate, triethylene glycol di-(2-ethylhexanoate), diethylene glycol dipelargonate, dibutyl phthalate, dioctyl phthalate, dibutoxy ethyl phthalate, dipropylene glycol dibenzoate, butyl benzyl phthalate, dibenzyl sebacate, dibenzyl phthalate, tricresyl phosphate, octyl diphenyl phosphate, chlorinated paraffine, alkyd derivatives of rosin and the like. The blend of resin and plasticizer is normally formed within the limits of about 15 to about 150 parts of plasticizer per 100 parts of resin with about 40 to about 100 parts plasticizer being preferred.

The coating composition also contains fillers and pigments in accordance with the particular background color desired in the finished product. Inert fillers, such as silica, both amorphous and crystalline, whiting, talc, clay, pumice, limestone and the like are suitable. Pigments are selected in accordance with the desired color. For example, where a white background is desired, titanium dioxide and zinc oxide either alone or with extenders such as barium sulfate, calcium sulfate, magnesium carbonate, magnesium silicate and the like can be used. For colored background coatings, any of the well-known organic or inorganic pigments can be used in the coating emulsion. In the production of the coating composition in the form of an emulsion, the pigments and fillers are normally ground with water in the presence of wetting agents, thickening agents and the like and the resulting dispersion is mixed with a previously formed emulsion of resinous binder. Formulation is simplified by the fact that emulsions of resinous binders are commercially available and are readily pigmented and filled to form suitable coating emulsions for use in the invention.

The coating composition also contains stabilizers to minimize degradation by light and heat. Suitable light stabilizers include resorcinol disalicylate, resorcinol dibenzoate, phenyl phthalate, phenyl benzoate, o-tolyl benzoate, eugenol, guaiacol, o-nitrophenol, o-nitroaniline, triethylene glycol salicylate, and organic phosphates and other complexes of such metals as barium, cadmium, strontium, lead, tin and the like. Suitable heat stabilizers include sulfides and sulfites of aluminum, silver, calcium, cadmium, magnesium, cerium, sodium, strontium and the like, glycerine, leucine, alanine, o- and p-amino benzoic and sulfanilic acids, hexamethylene tetramine, weak acid radicals including oleates, recinoleates, abietates, salicylates and the like. Normally, the composition contains from about 0.5 to about 5 parts stabilizer per 100 parts resin.

The use of a highly pigmented and filled emulsion of resinous binder and plasticizer is preferred but the coating can be applied from different types of liquid compositions. For example, thermoplastic resinous plastisol, organosol or aqueous emulsion coating systems can be used. In this case, the dispersion medium instead of being water is a plasticizer for the resinous binder in the case of a plastisol and a mixture of plasticizer and volatile organic solvent in the case of an organosol. Since it is desired to obtain a thin dense layer which completely covers and hides the backing, a dispersion containing high percentages of pigment and filler is particularly desirable.

When using the preferred technique of coating to apply a pigmented layer to a surface of the backing, the resinous composition is applied to the backing by way of the conventional techniques well known in the coating art, such as a reverse roll coater, doctor blade coating, spray application, brush application and the like. After the coating has been applied to the backing, the sheet is usually subjected to heat in order to evaporate any volatile components and to fuse the resinous binder into a flexible uniform film. In the case of an aqueous latex emulsion coating system, the heat treatment step serves to evaporate water in the emulsion. The temperature which the coated layer must attain is dependent on the particular resinous binder used. With the preferred thermoplastic resinous binders, the coating is preferably heated to the fusion temperature of the resin, that is the temperature at which the resin becomes solvated by plasticizer to yield a smooth flexible tough film. Where the thermoplastic resinous binder contains no plasticizer, the coating is heated to a temperature sufficient to soften the resin, thereby causing the minute particles present in the emulsion to coalesce and form a uniform film. Heating to a temperature within the range of about 250° F. to about 375° F. is usually sufficient to evaporate the carrier present and to yield a uniform film. A similar heat treatment step is carried out when an elastomeric resinous coating composition is applied to a surface of the backing to yield a pigmented layer thereon. Where the thermosetting resinous binders are used in the coating emulsion, the temperature to which the coating is subject must be sufficient to evaporate all the carrier in the emulsion but generally insufficient to completely cure the resin. Heating can be effected by passing the sheet through a forced hot air oven or radiant heating elements can be placed above the coated surface.

In accordance with the invention, a layer of opaque, transparent (including translucent), or a combination of opaque and transparent fine granules are distributed on the surface of the base. This layer should have a minimum thickness of 0.015 inch. These granules are preferably prepared by blending the components of the compositions in a suitable mixing apparatus. The size of the granules is critical to the invention and should be about 0.40 to about 0.005 inch in their largest dimension and preferably from about 0.05 to about 0.01 inch in diameter. The best results have been obtained by utilizing as the granules a dry blend composition. This is prepared by utilizing calender grade resin which has large particle size usually of the order of about 0.003 to about 0.025 inch in diameter. The dry resin particles are mixed with plasticizer and stabilizer at a temperature of about 200° F. which is well below the normal fusion temperature of resins. The mixture is discharged from the mixer and is in the form of fine unfused granules. A minor portion of larger granules or flakes can be present to give the product added decorative appeal.

Polymers of vinyl chloride have been found to be particularly effective in formulating the granules for use in the invention. The vinyl chloride polymers can either be simple, unmixed homopolymers of vinyl chloride or polymers thereof in which the essential polymeric structure polyvinyl chloride is interspersed at intervals with the residues of other ethylenically unsaturated compounds polymerized therewith. The essential properties of the polymeric structure of polyvinyl chloride will be retained if not more than 40 percent of the extraneous monomers are polymerized therein. Suitable extraneous comonomers include, for instance, vinyl esters on the order of vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds on the order of vinylidene chloride, vinylidene bromide, vinylidene fluorochloride and the like; unsaturated hydrocarbons, such as ethylene, propylene, isobutene and the like; allyl compounds, such as allyl acetate, allyl chloride, allyl ethyl ether and the like; and conjugated and cross-conjugated ethylenically unsaturated compounds such as butadiene; isoprene; chloroprene; 2,3-dimethylbutadiene-1,3-piperylene; divinyl ketone and the like.

Polymers of vinyl chloride having specific viscosities above about 0.17 and preferably between about 0.17 and about 0.31 as measured in a solution of 0.2 gram of resin in 100 milliliters of nitrobenzene at 20° C. are particularly effective. In the determination of specific viscosities, the sample of resin in nitrobenzene solution maintained at a temperature of 20° C. is allowed to flow between two calibrated marks in a pipette and time required is recorded. This time is compared with the time required for a control of pure nitrobenzene solvent to pass between the same two marks, also at a temperature of 20° C. The specific viscosity is determined as the sample flow time divided by the control flow time, minus 1. The specific viscosity is a unitless number but is an effective measure of relative molecular weight of the polymer, the higher the specific viscosity the higher being the molecular weight.

Although a vinyl chloride polymer is particularly effective in the compositions of the granules for use in the invention, these compositions can also be formed from other thermoplastic resins as well as rubbery elastomeric and thermosetting resins, such as disclosed above in the discussion of the coating composition. The resinous system selected for the composition of the granules should be compatible with the resin in the pigmented layer to insure maximum adhesion between the pigmented layer and the decorative wear layer. In addition, the resin selected should be capable of being formulated into a clear transparent composition, if necessary. For example, when the pigmented layer is formed of a thermosetting resinous composition, the composition of the granules should also be of the thermosetting resinous type, with the particular resin selected being compatible with the composition of the pigmented layer.

The compositions can also contain small amounts of a release additive in order that the product can be more easily removed from the surface against which the decorative composition is molded to form the smooth uniform sheet. Suitable release additives are waxy substances of both synthetic and natural origin with the vegetable waxes such as carnauba wax being particularly effective. Where a release additive is used, the composition normally will contain from about 0.2 to about 5 parts of release additive per 100 parts resin. The compositions also contain stabilizers to minimize degradation by light and heat, such as disclosed above in the description of the coating compositions.

The clear transparent composition contains resinous binder, stabilizer and a release additive, if desired. It is not highly pigmented and filled. Color can be imparted to the clear composition by the use of small amounts of pigment or organic dye, but the amount used must not be sufficient to impart any appreciable degree of opacity to the composition. The opaque composition also preferably contains filler in order to reduce the cost of the composition. The opaque composition can contain up to about 80 percent by weight of pigment and filler. Pigment is used in order to impart the desired color and opacity to the composition and can be any of the well-known organic or inorganic pigments widely used in the plastic surface covering industry. The opaque composition can also contain inert fillers, such as whiting, clay, talc, pumice, limestone and the like. The size of the pores which are formed by the sintering can be influenced by a suitable selection of the size of the grains of the vinyl chloride polymer, by the amount of plasticizer or mixture of plasticizer and solvents, and the sintering temperature utilized. All of these factors will affect the depth of penetration of the printing composition. The plasticizer is usually present in about 15 to about 100 parts per 100 parts of resin with about 20 to about 40 parts plasticizer being preferred.

As indicated, a substance which on further treatment will create voids in the granular layer can be mixed with the granules to increase the penetration of the printing composition and also, if desired, to produce an embossed product. The embossing can be in complete register with the printed design. Such additive can take many forms, although as a general rule, the size of the particles of additive should be the same range as the granules, i.e., about 0.005 to about 0.40 inch in their largest dimension and preferably from about 0.05 to about 0.01 inch. One form of additive is any water or solvent soluble crystalline compound. Such a compound would have to be soluble in a solvent which would not adversely affect the granules. Typical of such compositions are the water soluble alkali metal salts of chloride, bromides and iodides, and the like. As a general rule, the average particle size should be at least 50 microns. When utilizing compositions of this nature, the layer of granules after sintering is washed with a suitable solvent to dissolve the crystals and remove them from the sintered sheet. Agents which decompose upon heating to yield a gas have been found particularly effective. When utilizing such agents, however, it is important that the gas generated during decomposition is not entrapped in the sintered composition. Ammonium bicarbonate is a particularly effective agent of this type. Another method which is also particularly effective is the utilization of a plasticizer which is solid at lower temperatures, but, upon heating to sintering temperature, the plasticizer will be absorbed by the resin. Typical examples of such plasticizers are chlorinated polyphenyl which has a softening point between 300 to 340° F., chlorinated polyethylene, dicyclohexyl phthalate, diphenyl phthalate and triphenyl phosphate. An agent which contracts upon heating can also be used. Hollow spherical particles of resin such as styrene is a good illustration of this type of agent. The amount of such an additive can vary widely.

If its addition is merely to increase porosity of the sintered granules, from about 5 to about 20% has been found particularly effective. If it is to be utilized to produce texture the amount can be substantially higher. As is apparent, it is highly desirable to have the agent mixed uniformly with the granules.

In accordance with the invention, a design is applied to the sintered granules or, prior to sintering, with a resinous composition. Suitable compositions comprise a thermoplastic resinous binder dispersed in a liquid medium. The printing composition can, however, be a solid powder. When using a solid powder, it is necessary that the particle size be substantially smaller than the sintered granules to permit penetration. The design is preferably printed on the granules, utilizing conventional printing apparatus such as a silk screen printing machine. Other methods can be used, however, for applying the printing composition on the base in a continuous or discontinuous band or other shape. By oscillating or otherwise moving the extruded composition, intricate effects can be obtained. It is essential to the invention that the design have appreciable thickness in the finished product in order to obtain the desired result. A penetration of at least 25% of the thickness of the layer and preferably at least 75% into the sintered granules is required. For very thick layers, it may be necessary to apply the design in a number of layers, one on top of the other to deposit sufficient material to obtain the desired penetration.

The resinous binder in the design composition is preferably one that is coalesced or fused into a continuous film by the application of heat. The vinyl resins are preferred since they are readily adaptable to use as liquid compositions, such as plastisols and organosols, but other thermoplastic resins can be used such as polymers and copolymers of acrylic acid and methacrylic acid and their derivatives, polystyrene, polymerized methyl styrene, polybutadiene and the like. It should be understood, however, that these latter resins are usually used in latex form and, therefore, it is necessary to remove the water prior to further treatment. A plastisol has a thermoplastic resin in the form of fine particles thoroughly and uniformly dispersed in plasticizer. The fluidity of plastisols is influenced in part by the particular resin selected but is also a function of the ratio of plasticizer to resin. Plastisols become less fluid as the ratio of plasticizer to resin is reduced. Plastisol compositions for use in the invention contain from about 40 to about 100 parts plasticizer per 100 parts of resin. An organosol is a dispersion of the resin in plasticizer and a solvent carrier. As a general rule, the solvent forms from about 5 to 20 percent of the composition. The amount of solvent controls the viscosity of the organosols. Both organosols and plastisols have appreciable fluidity at normal room temperatures which make them printable and are converted by heat into a flexible, tough thermoplastic mass. This ultimate result is brought about by the process of fusion wherein the resin becomes plasticized and solvated by the plasticizer. The resin utilized in the printing compositions can be the same as described above for the granules, but must have a particle size smaller than the granules.

Minor amounts of stabilizers which are incorporated to reduce the effects of degradation by light and heat are present in the composition. Suitable stabilizers include those listed above for use in the coating composition. Normally, the printing fluid contains from about 0.5 to about 5 parts stabilizer per 100 parts resin. The particular stabilizers chosen should not impart excessive viscosity to the compositions.

Suitable compositions for forming the printing composition have a viscosity at 25° C. of from about 200 to about 25,000 centipoises as measured with a Brookfield viscometer using a No. 6 spindle at 10 r.p.m. For printing by the flat bed technique, a viscosity range of about 500 to about 5,000 centipoises is desirable with a range of 1,000 to 3,500 centipoises being particularly effective. The viscosity for the composition is not critical but if it is to be applied by a printing operation, these viscosities are particularly effective.

The design composition contains pigments in accordance with the particular color desired. Where a multi-colored decorative effect is created in accordance with the invention, separate batches of composition for each of the colors desired are needed. Any of the organic and inorganic pigments well known in the art for pigmenting resinous compositions can be used. Normally from about 0.5 to about 5 parts pigments per 100 parts resin are used. It has been found that the addition of a dispersion of titanium dioxide in plasticizer in an amount of 0.5 to 5.0 parts per 100 parts of resin substantially improves the penetration of the printing composition into the sintered layer.

A product having a textured appearance can also be produced by incorporating a blowing agent in the printing composition which will decompose on the application of heat to form a cellular composition. Any of the blowing agents commonly utilized in resinous composition are suitable such as p,p'-oxybis (benzene sulfonyl hydrazide); p,p'-oxybis (benzene sulfonyl semicarbazide); 2,2'-azobisisobutyronitrile; N,N' - dimethyl - N,N' - dinitrosoterephthalamide; diazoaminobenzene and 1,1'-azobisformamide. This latter blowing agent is particularly useful since it decomposes at a temperature above the fusion temperature of most resinous compositions. This will allow the composition to be fused and then, on heating to a higher temperature, the blowing agent will decompose. As an illustration, about two to ten parts of 1,1'-azobisformamide is added to each hundred parts of printing composition with about 0.5 part of dibasic lead phosphite as an accelerator for the blowing agent. Upon heating the printing composition, after consolidation of the sintered granules, to about 350 to 400° F., the blowing agent will decompose to form a cellular structure which will cause the printed areas to be raised.

The processing conditions will, of course, vary depending upon the particular type of resinous material used. Those skilled in the art of processing resins would be able to select the proper temperatures and pressures required to yield a smooth, tough and durable product depending on the resin selected. When utilizing the preferred vinyl chloride polymer, it is usually necessary to heat the composition to about 300° F. to about 375° F. to cause the granules to be sintered together. The subsequent consolidation can be carried out at various pressures and preferably from about 100 to about 1000 pounds per square inch in a press. The temperature should be higher than the sintering temperature to cause complete solvation of the resin with plasticizer and fusion of the composition into a solid nonporous mass. If the sheet is consolidated by passage through calender rolls, the composition is heated to its fusion temperature and the rolls are maintained at a temperature substantially lower. Using the preferred polyvinylchloride resin, the composition would be heated to about 350 to about 425° F. and the calender rolls would be maintained at about 250 to about 300° F. Planishing rolls utilizing a rubber-covered back-up roll have the advantage that a textured sheet can be produced by limiting the pressure exerted on the composition. The area covered by the printing composition can extend or be raised slightly above the surface of the sheet.

Products produced in accordance with the invention have a hard and durable wearing surface intimately and firmly bonded to the backing web. The decorative wearing surface can have a geometric-type design which either extends completely through the wear layer of the product or extends for a substantial distance into the wear layer of the product and is visible through the transparent or translucent areas in the wear layer, giving the product an appearance of depth.

The following examples are given for purposes of illustration:

*Example I*

A coating emulsion having the following composition is prepared:

| | Parts (dry) |
|---|---|
| Vinyl chloride polymer latex [1] (50% solids) | 30 |
| Butadiene-acrylonitrile copolymer [2] (50% solids) | 20 |
| Titanium dioxide dispersion (60% solids) | 14 |
| Calcium carbonate dispersion (60% solids) | 54 |
| Sodium alkyl aryl sulfonate | 2 |
| Methyl cellulose suspension (7% solids) | 15 |
| Water. | |

[1] A copolymer of 90% vinyl chloride and 10% dibutyl maleate sold under the name Pliovic 300 by Goodyear Tire & Rubber Company, Akron, Ohio.
[2] A copolymer of 67% butadiene and 33% acrylonitrile sold under the name Chemigum C3–1021 by Goodyear Tire & Rubber Company, Akron, Ohio.

A cellulosic felt sheet of approximately 0.043 inch thickness impregnated with about 9 percent polyvinyl acetate and about 30 percent of a petroleum resin having a softening point of 125° F. is coated on one surface with the coating emulsion by means of a reverse roll coater. The coating which is about 0.003 inch in thickness is then dried by exposure to a temperature of about 300° F. for five minutes.

Granules were prepared by mixing the following components together at a temperature of 200° F.:

| | Parts |
|---|---|
| Vinyl chloride homopolymer (sp. viscosity 0.28)— particle size of .005″ to .028″ | 100 |
| Dioctyl phthalate | 30 |
| Stabilizer | 3 |

The granules are passed through a 30 mesh screen (0.023 by 0.023 inch openings). The granules were then distributed on the coated felt sheet to form a uniform layer of 0.08 inch in thickness. The layer was then heated for three minutes in an oven heated to 350° F. The granules, during this heating, reached a temperature of about 330° F. and were sintered into a uniform porous mass. The sintered mass was then cooled and a multicolored design printed on its surface utilizing a conventional block printing machine. The printing composition had the following composition:

| | Parts |
|---|---|
| Vinyl chloride copolymer (dispersion grade, sp. viscosity 0.40) | 100 |
| Dioctyl phthalate | 90 |
| Pigment (TiO$_2$) | 2 |
| Stabilizer | 5 |
| V. M. and P. naphtha (boiling range 190–275° F.) | 2 |

The printed sintered composition was then passed to a press which consolidated the sheet at a pressure of 500 pounds per square inch and a temperature of 350° F. for two minutes. The resulting sheet had a wear layer thickness of about 0.05 inch. The printed design extended completely through the product.

*Example II*

The procedure of Example I was followed except that three parts of 1,1'-azobisformamide as a blowing agent and 0.5 part of dibasic lead phosphite were added to the printing composition. The final product was heated to 400° F. to decompose the blowing agent. The resulting sheet was identical to Example I except that the printed areas were raised about 0.015 inch above the surface of the sheet.

*Example III*

The procedure of Example I was followed except that the following printing composition was substituted for the composition in Example I:

| | Parts |
|---|---|
| Vinyl chloride polymer (dispersion grade; sp. viscosity 0.04) | 100 |
| Dioctyl phthalate | 100 |

| | Parts |
|---|---|
| Pigment (TiO₂)-(dispersion 70% in butyl benzyl phthalate) | 20 |
| Xylene | 1000 |
| Cabosil | 50 |
| Stabilizer | 5 |

The printed sintered granules were heated to 300° F. for one minute prior to consolidation to remove the solvent. The resulting product was substantially identical to that obtained in Example I except that the final thickness of the wear layer sheet was about 0.040 inch.

*Example IV*

The procedure of Example I was followed except that the following latex printing composition was substituted for the composition of Example I:

| | Parts |
|---|---|
| Vinyl chloride latex | 100 |
| Dispersion aid | 10 |
| Pigment | 10 |
| Thickener | 2 |
| Water | 1000 |

The printed sintered granules were heated at 250° F. for one and one-half minutes prior to consolidation to remove the water. The resulting products were substantially identical to that obtained in Example III.

*Example V*

The procedure of Example I was followed except that 20% by weight of sodium chloride was admixed with the granules and the layer of granules applied was about 0.05 inch in thickness. After sintering the sheet, it was washed with water to remove the sodium chloride. The sintered sheet was then dried prior to printing. The sintered sheet was printed in a mosaic pattern with no printing composition being applied to the mortar line areas. In placing of the pressing step in Example I, the printed sheet was then heated to 375° F. and planished by passing between two rolls. The face roll was heated to approximately 250° F. and the back-up roll was rubber-covered and unheated. The mortar line area in the finished product was depressed about 0.010 inch below the surface of the product.

*Example VI*

The procedure of Example I was followed, except that 10% by weight of ammonium carbonate was admixed with the granules. The mixture was distributed on the coated felt to form a layer 0.050 inch in thickness. The sheet was then sintered for six minutes at 350° F. After cooling, the sheet was printed and planished in a manner described in Example V. The final sheet had a printed decoration extending through its entire thickness and a mortar line of about 0.008 inch in depth on average.

*Example VII*

The procedure of Example VI was followed, except that ammonium carbonate was replaced by 15% by weight of a solid, powdered triphenyl phosphate (average 100 microns in largest dimension) and the sintering was carried out for three minutes at 350° F. The resulting product has an embossed surface of a depth of about 0.010 inch on average in the mortar line areas.

Any departure from the foregoing description which conforms to the invention is intended to be included within the scope of the claims.

What is claimed is:

1. A process for producing a non-porous decorative surface covering having an inlaid decoration which comprises depositing fine granules of resinous composition in a layer at least 0.015 inch in thickness on the surface of a backing sheet, heating to cause sintering of said granules without complete coalescence thereof to form a layer of uniform porosity, applying a design on the surface of the sintered layer with sufficient printing composition to permeate into the porous structure to a substantial depth at the points of application and then molding the printed sintered layer into a non-porous sheet by the application of heat.

2. The process of claim 1 wherein said printing composition is selected from the group consisting of a plastisol, organosol and aqueous dispersion.

3. The process of claim 1 wherein the porosity of the sintered layer is substantially increased by admixing fine particles of a solvent soluble compound with said granules and thereafter treating said sintered layer with a solvent to remove said soluble compound.

4. The process of claim 1 wherein the porosity of the sintered layer is substantially increased by admixing fine particles of a heat unstable compound with said granules and thereafter heating said mixture to decompose said unstable compound.

5. The process of claim 1 wherein the porosity of the sintered layer is substantially increased by admixing fine particles of a high melting solid plasticizer for said resinous composition with said granules and thereafter heating said mixture to cause the plasticizer to be absorbed by said resinous composition.

6. The process of claim 1 wherein the porosity of the sintered layer is substantially increased by admixing fine particles of a heat-shrinkable composition with said granules and thereafter heating said mixture to cause said heat-shrinkable compound to shrink.

7. The process of claim 1 wherein said printed granular layer is reduced by at least one-third in thickness by pressing during said molding.

8. The process of claim 2 wherein said printing composition comprises a resin, plasticizer and about 0.5 to about 5 parts of titanium dioxide per hundred parts of resin.

9. The process of claim 1 wherein said granules have a maximum diameter of from about 0.10 to about 0.005 inch.

10. The process of claim 1 wherein said resinous composition is a vinyl chloride polymer composition.

11. The process of claim 1 wherein said molding is carried out by heating the printed layer and passing the heated layer between two calender rolls.

12. The process of claim 1 wherein a blowing agent is added to the printing composition and the non-porous sheet is heated to decompose said blowing agent.

13. The process of claim 10 wherein said granules are a dry blend of unfused resin particles.

14. The process of claim 10 wherein said layer of granules is heated to a temperature of about 300° F. to about 375° F. to sinter the granules.

15. The process of claim 1 wherein said molding is carried out at a temperature above said sintering temperature within the range of about 350° F. to about 425° F.

16. The process of claim 15 wherein sufficient printing composition is applied to said sintered layer to produce a product having a textured surface.

17. A process for producing a non-porous decorative surface covering having an inlaid decoration which comprises mixing particles of vinyl chloride polymer with plasticizer to form a non-homogeneous mixture of non-adherent granules, depositing the granules in a smooth layer on the surface of a backing sheet, heating to cause sintering of said granules without complete coalescence thereof to form a layer of uniform porosity, printing a design on the surface of the sintered layer with a vinyl polymer composition of sufficient amount to permeate into the porous structure to a depth of at least one-third the thickness of said layer and then molding the printed, sintered layer into a non-porous sheet by the application of heat and pressure.

18. A process for producing a non-porous decorative surface covering having an inlaid decoration which comprises mixing particles of vinyl chloride polymer with plasticizer to form a non-homogeneous mixture of non-adherent granules, depositing the granules in a smooth layer on the surface of a backing sheet, heating to cause sintering of said granules without complete coalescence thereof to form a layer of uniform porosity, printing a design on the surface of the sintered layer with a vinyl plastisol of sufficient amount to permeate into the porous structure for at least 25% of the thickness of said layer, heating the printed, sintered layer to the fusion temperature of the composition and then passing the heated composition between calender rolls maintained at a temperature substantially below the fusion temperature of said composition to form said printed, sintered layer into a non-porous sheet.

19. A process for producing a non-porous decorative surface covering having an inlaid decoration which comprises depositing fine granules of thermoplastic composition in a layer of at least 0.015 inch in thickness and of uniform porosity on a backing sheet, printing a design on the surface of said layer with sufficient printing composition to permeate into the porous structure to a depth of at least one-third the thickness of said layer at the points of application and then molding the printed layer into a non-porous sheet by the application of heat and pressure.

No references cited.

ROBERT E. WHITE, *Primary Examiner.*

J. R. HALL, *Assistant Examiner.*

Disclaimer 3,359,352.—*William H. Powell*, Livingston, and *Lawrence J. Friedman*, Fort Lee, N.J. PROCESS FOR PRODUCING DECORATIVE SURFACE COVERING. Patent dated Dec. 19, 1967. Disclaimer filed Aug. 24, 1973, by the assignee, *Congoleum Industries, Inc.*

Herby enters this disclaimer to claims 1, 2, 4, 10, 13 and 19 of said patent.

[*Official Gazette December 11, 1973.*]